United States Patent
Coppola et al.

(10) Patent No.: US 8,007,913 B2
(45) Date of Patent: Aug. 30, 2011

(54) LAMINATED GLASS ARTICLES AND METHODS OF MAKING THEREOF

(75) Inventors: Frank T. Coppola, Elmira, NY (US); Josef C. Lapp, Corning, NY (US); Monica J. Mashewske, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1005 days.

(21) Appl. No.: 11/702,858

(22) Filed: Feb. 6, 2007

(65) Prior Publication Data

US 2007/0190340 A1 Aug. 16, 2007

Related U.S. Application Data

(60) Provisional application No. 60/772,034, filed on Feb. 10, 2006.

(51) Int. Cl.
*B32B 17/06* (2006.01)
(52) U.S. Cl. .......... 428/426; 428/428; 428/688
(58) Field of Classification Search .......... 428/213, 428/432, 426, 428, 688
See application file for complete search history.

(56) References Cited

U.S. PATENT DOCUMENTS

| | | | | |
|---|---|---|---|---|
| 2,961,328 A | 11/1960 | Babcock et al. | 106/52 |
| 3,338,696 A | 8/1967 | Dockerty | 65/145 |
| 3,673,049 A * | 6/1972 | Giffen et al. | 428/213 |
| 3,682,609 A | 8/1972 | Dockerty | 65/83 |
| 4,214,886 A | 7/1980 | Shay et al. | 65/121 |
| 4,394,453 A | 7/1983 | Dumbaugh, Jr. | 501/66 |
| 4,405,672 A * | 9/1983 | Araujo et al. | 428/68 |
| 4,634,683 A | 1/1987 | Dumbaugh, Jr. | 501/32 |
| 4,634,684 A | 1/1987 | Dumbaugh, Jr. | 501/69 |
| 4,666,868 A | 5/1987 | Dumbaugh, Jr. | 501/32 |
| 4,666,869 A | 5/1987 | Dumbaugh, Jr. | 501/32 |
| 5,116,787 A | 5/1992 | Dumbaugh, Jr. | 501/66 |
| 5,116,788 A | 5/1992 | Dumbaugh, Jr. | 501/66 |
| 5,116,789 A | 5/1992 | Dumbaugh et al. | 501/66 |
| 5,326,730 A | 7/1994 | Dumbaugh et al. | 501/69 |
| 5,342,426 A * | 8/1994 | Dumbaugh, Jr. | 65/23 |
| 5,374,595 A | 12/1994 | Dumbaugh et al. | 501/66 |
| 5,489,558 A | 2/1996 | Moffatt et al. | 501/69 |
| 5,506,180 A | 4/1996 | Ponthieu | 501/66 |
| 5,508,237 A | 4/1996 | Moffatt et al. | 501/69 |
| 5,741,746 A | 4/1998 | Kohli et al. | 501/70 |
| 5,770,535 A | 6/1998 | Brix et al. | 501/67 |
| 5,801,109 A | 9/1998 | Nishizawa et al. | 501/66 |
| 5,851,939 A | 12/1998 | Miwa | 501/70 |
| 6,060,168 A | 5/2000 | Kohli | 428/428 |
| 6,096,670 A | 8/2000 | Lautenschläger et al. | 501/67 |

(Continued)

FOREIGN PATENT DOCUMENTS

DE 4213579 10/1992
(Continued)

OTHER PUBLICATIONS

U.S. Appl. No. 60/772,600, filed Feb. 10, 2006, F.T. Coppola et al.

*Primary Examiner* — Jennifer C McNeil
*Assistant Examiner* — Lauren Robinson
(74) *Attorney, Agent, or Firm* — Thomas R. Beall; Maurice M. Klee

(57) ABSTRACT

Disclosed are laminated glass articles and methods of making the same.

18 Claims, 1 Drawing Sheet

U.S. PATENT DOCUMENTS

| | | | |
|---|---|---|---|
| 6,319,867 B1 | 11/2001 | Chacon et al. | 501/66 |
| 2004/0029702 A1 | 2/2004 | Naumann et al. | 501/70 |
| 2004/0197575 A1* | 10/2004 | Bocko et al. | 428/432 |
| 2005/0001201 A1* | 1/2005 | Bocko et al. | 252/299.01 |

FOREIGN PATENT DOCUMENTS

| | | |
|---|---|---|
| DE | 19601922 | 5/2001 |
| EP | 0 672 629 | 2/1995 |
| EP | 0 672 629 | 9/1995 |
| EP | 0 714 862 | 3/1999 |
| EP | 0 576 362 | 8/1999 |
| FR | 2675795 | 10/1992 |
| GB | 479173 | 1/1938 |
| JP | 07-277763 | 10/1995 |
| JP | 09-110460 | 4/1997 |
| JP | 09-156953 | 6/1997 |
| JP | 2644622 | 8/1997 |
| JP | 10-025132 | 1/1998 |
| JP | 10-072237 | 3/1998 |
| JP | 10-114538 | 5/1998 |
| JP | 10-130034 | 5/1998 |
| JP | 10-139467 | 5/1998 |
| JP | 10-231139 | 9/1998 |
| JP | 10-324526 | 12/1998 |
| JP | 11-043350 | 2/1999 |
| JP | 2871163 | 3/1999 |
| JP | 11-292563 | 10/1999 |
| JP | 2002-003240 | 1/2002 |
| WO | 97/11919 | 4/1997 |
| WO | 97/11920 | 4/1997 |
| WO | 98/27019 | 6/1998 |
| WO | WO 98/27019 | 6/1998 |

* cited by examiner

LAMINATED GLASS ARTICLES AND METHODS OF MAKING THEREOF

CROSS-REFERENCE TO RELATED APPLICATIONS

This application claims the benefit of U.S. Application Ser. No. 60/772,034 filed on Feb. 10, 2006 and entitled "Laminated Glass Articles and Methods of Making Thereof" which is incorporated by reference herein in.

BACKGROUND

In the AMLCD and OLED display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which in turn allows the production of brighter and faster displays.

One problem with p-Si based transistors is that their manufacture requires higher process temperatures than those employed in the manufacture of a-Si transistors. These temperatures range from 450 to 600° C. compared to the 350° C. peak temperatures employed in the manufacture of a-Si transistors. At these temperatures, most AMLCD glass substrates undergo a process known as compaction. Compaction, also referred to thermal compaction, is an irreversible dimensional change (shrinkage or expansion) in the glass substrate due to changes in the glass' fictive temperature. This hypothetical temperature is defined as that temperature at which the glass structure is in thermal equilibrium. As such, the fictive temperature of a glass is a measure of the glass' viscoelastic response to its previous thermal history. Since the manufacture of these transistors require the sequential alignment of 4-6 layers to micron tolerances through photolithography processes, this compaction behavior is problematic. Compaction is dependent upon both the inherent viscous nature of a particular glass composition (as indicated by its strain point) and the thermal history of the glass sheet as determined by the manufacturing process. Higher temperature processing (such as required by low temperature p-Si TFTs) may require the addition of an annealing step to the glass substrate to ensure the glass has sufficient thermal stability, i.e. undergoes minimal compaction.

There are two approaches to correct, or minimize, the compaction behavior in glass. The first is to thermally pretreat the glass to create a fictive temperature similar to the one the glass will experience during the p-Si TFT manufacture. However there are several difficulties with this approach. First, the multiple heating steps employed during the p-Si TFT manufacture create slightly different fictive temperatures in the glass that cannot be fully compensated for by this pretreatment. Second, the thermal stability of the glass becomes closely linked to the details of the p-Si TFT manufacture, which could mean different pretreatments for different customers. Finally, pretreatment adds to processing costs and complexity.

Another approach is to slow the kinetics of the compaction response. This can be accomplished by raising the viscosity of the glass. Thus if the strain point of the glass is much greater than the process temperatures to be encountered (>~200-300° C.), compaction is minimal. The problem with this approach, however, is how to make such high strain point glass substrates cost effectively. For example, the fusion process, which is highly valued in these applications for its ability to make very smooth surfaces, requires a glass that is very stable with respect to devitrification. This requirement precludes the manufacture of "fragile" type glasses on a fusion draw. Fragile glasses are glasses having a steep viscosity curve, for example, very high strain point (for minimal compaction) and low melting temperature (for easy melting). See for reference, C. A. Angell, "Spectroscopy Simulation and Scattering, and the Medium Range Order Problem in Glass", J. Non-Cryst. Solids, 73 (1985) 1-17. These types of glasses tend to be more prone to devitrification (formation of a crystalline phase in the glass, and, as a result, tend to be less compatible with the forming requirements imposed by the fusion process.

What is needed in the art are low compaction p-Si glass substrates. It would be desirable to manufacture a lower compaction (high strain point) glass without having to significantly raise the thermal capability of drawing process (e.g., the fusion drawing). To address this need, described herein are laminated glass articles composed of a skin and a core, wherein the skin is composed of a low compaction and high strain point glass.

SUMMARY

In accordance with the purposes of the disclosed materials, compounds, compositions, articles, devices, and methods, as embodied and broadly described herein, the disclosed subject matter, in one aspect, relates to laminated glass articles and methods of making the same.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1:
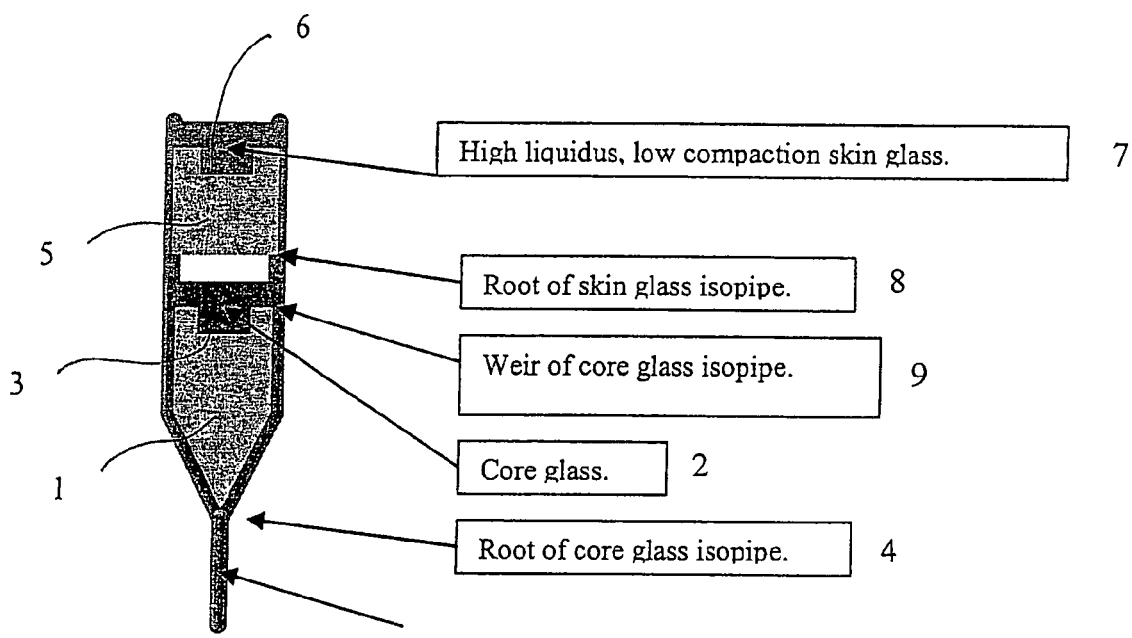
FIG. 1 is a cross-sectional view of a double fusion process for making a laminated glass article.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the layer" includes mixtures of two or more such layers, and the like.

"Optional" or "optionally" means that the subsequently described event or circumstance can or cannot occur, and that the description includes instances where the event or circumstance occurs and instances where it does not.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Corning Incorporated (Corning, N.Y.), Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Reference will now be made in detail to specific aspects of the disclosed materials, compounds, compositions, articles, and methods, examples of which are illustrated in the accompanying Examples and Figures.

I. Laminated Glass Articles

In one aspect, described herein are glass articles comprising (1) a glass core comprising at least one exposed surface and (2) a glass skin, wherein the skin is connected to the exposed surface of the core, wherein the skin comprises a glass composition comprising a strain point greater than 650° C. The term "connected" as used herein includes when the skin is adjacent to (i.e., intimate contact with) the exposed surface of the core or is indirectly attached to the core by way of one or more intermediate layers. The term "exposed surface" as defined herein is any surface of the core glass that can be in contact with the skin glass if contacted by the skin glass. The glass article can have one or more exposed surfaces. For example, when the glass core is a sheet of glass, the core has two exposed surfaces, wherein one or both surfaces can have a glass skin connected to it. The nature of the skin and core glass compositions is described in detail below.

a. Skin The glass compositions useful herein to produce the skin have a strain point greater than 650° C. In other examples, the skin glass composition can have a strain point greater than 655, 660, 665, 670, 675, 680, 685, 690, 695, 700, 705, 710, 715, 720, 725, 730, 735, 740, 745, 750 760, 770, 780, 790, or 800° C., where any of the stated values can form an upper or lower endpoint when appropriate. In one aspect, the skin comprises glass having a strain point from 700° C. to 800° C. In another aspect, the skin comprises glass having a strain point from 700° C. to 750° C. The strain point of the disclosed compositions can be determined by one of ordinary skill in the art using known techniques. For example, the strain point can be determined using ASTM method C336.

In another aspect, the skin glass composition can have a liquidus viscosity greater than 15,000, 20,000, 25,000, 30,000, 35,000, 40,000, 45,000, 50,000, 60,000, 70,000, 80,000, 90,000, 100,000, 200,000, 300,000, 400,000, or 500,000 poises, where any of the stated values can form an upper or lower endpoint when appropriate. The liquidus temperatures of the glasses can be measured by a technique known as the standard liquidus method. The standard liquidus method (Liq.) involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. This technique is also referred to as "a gradient boat technique." In one aspect, the skin comprises glass having a liquidus viscosity of from 20,000 to 50,000 poises as measured by a gradient boat technique. In another aspect, the skin comprises glass having a liquidus viscosity of from 35,000 to 50,000 poises as measured by a gradient boat technique.

In a further aspect, the skin glass has a thermal compaction less than 30 ppm, less than 25 ppm, less than 20 ppm, less than 15 ppm, or less than 10 ppm.

In one aspect, the skin comprises an alkali-free glass comprising in mole percent on an oxide basis:

| | |
|---|---|
| $SiO_2$ | 64.0-72.0 |
| $B_2O_3$ | 1.0-5.0 |
| $Al_2O_3$ | 9.0-16.0 |
| $MgO + La_2O_3$ | 1.0-7.5 |
| CaO | 2.0-7.5 |
| SrO | 0.0-4.5 |
| BaO | 1.0-7.0 | wherein:
(a) $1.15 \leq \Sigma(MgO+CaO+SrO+BaO+3La_2O_3)/(Al_2O_3) \leq 1.55$, where $Al_2O_3$, MgO, CaO, SrO, BaO, and $La_2O_3$ represent the mole percents of the representative oxide components;
(b) the glass has a strain point greater than or equal to 700° C.;
(c) the glass has a temperature at 200 poise viscosity less than or equal to 1,665° C.; and
(d) the glass has a viscosity at the liquidus temperature greater than or equal to 85,000 poise.

In another aspect, the skin comprises an alkali-free glass comprising in mole percent on an oxide basis:

| | |
|---|---|
| $SiO_2$ | 65.0-71.0 |
| $Al_2O_3$ | 9.0-16.0 |
| $B_2O_3$ | 1.5-4.0 |
| $MgO + La_2O_3$ | 0.5-7.5 |
| CaO | 2.0-6.0 |
| SrO | 0.0-4.5 |
| BaO | 1.0-7.0 |
| $La_2O_3$ | 0.0-4.0 | wherein $\Sigma(MgO+CaO+SrO+BaO+3La_2O_3)/(Al_2O_3) \geq 1.15$, where $Al_2O_3$, MgO, CaO, SrO, BaO, and $La_2O_3$ represent the mole percents of the representative oxide components.

In a further aspect, the skin comprises an alkali-free glass comprising in mole percent on an oxide basis:

| | |
|---|---|
| $SiO_2$ | 65.0-72.0 |
| $Al_2O_3$ | 10.0-15.0 |
| $B_2O_3$ | 1.0-4.0 |
| MgO | 2.0-7.5 |
| CaO | 3.0-6.0 |
| SrO | 0.0-4.5 |
| BaO | 1.0-6.0 | wherein $\Sigma(MgO+CaO+SrO+BaO)/(Al_2O_3) \geq 1.15$, where $Al_2O_3$, MgO, CaO, SrO, and BaO represent the mole percents of the representative oxide components.

In the glass compositions described herein for the skin, $SiO_2$ serves as the basic glass former. In certain aspects, the concentration of $SiO_2$ can be greater than 64 mole percent in order to provide the glass with a density and chemical durability suitable for a flat panel display glass (e.g., an AMLCD glass), and a liquidus temperature (liquidus viscosity), which allows the glass to be formed by a downdraw process (e.g., a fusion process). In terms of an upper limit, in general, the $SiO_2$ concentration can be less than or equal to about 71 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,650° C. In one aspect, the $SiO_2$ concentration is between 66.0 and 71 mole percent or between 66.5 and 70.5 mole percent.

$Al_2O_3$ is another glass former used to make the skin glasses described herein. An $Al_2O_3$ concentration greater than or equal to 9 mole percent provides the glass with a low liquidus temperature and a corresponding high liquidus viscosity. The use of at least 9 mole percent $Al_2O_3$ also improves the glass' strain point and modulus. In order to achieve an $\Sigma(MgO+CaO+SrO+BaO+3La_2O_3)/(Al_2O_3)$ ratio greater than or equal to 1.15 (see below), it is desirable to keep the $Al_2O_3$ concentration below 16 mole percent. In one aspect, the $Al_2O_3$ concentration is between 12 and 15 mole percent.

$B_2O_3$ is both a glass former and a flux that aids melting and lowers the melting temperature. To achieve these effects, the skin glass compositions described herein have $B_2O_3$ concentrations that are equal to or greater than 1.0 mole percent.

As discussed above with $SiO_2$, glass durability is also very important for LCD applications. Durability can be controlled somewhat by elevated concentrations of alkaline earths and lanthanum oxides, and significantly reduced by elevated $B_2O_3$ content. As with strain point and Young's modulus, it is desirable to keep $B_2O_3$ content low. Thus, to achieve the above properties, in one aspect, the glasses described herein have $B_2O_3$ concentrations that are less than or equal to 5.0 mole percent, between 1.0 and 5.0 mole percent, between 1.0 and 4.0 mole percent, or between 2.0 and 4.0 mole percent.

The $Al_2O_3$ and $B_2O_3$ concentrations can be selected as a pair to increase strain point, increase modulus, improve durability, reduce density, and reduce the coefficient of thermal expansion (CTE), while maintaining the melting and forming properties of the skin glass. For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing strain point, modulus, and durability, provided that the increase in $Al_2O_3$ does not reduce the $\Sigma(MgO+CaO+SrO+BaO)/(Al_2O_3)$ or $\Sigma(MgO+CaO+SrO+BaO+3La_2O_3)/(Al_2O_3)$ ratio below about 1.15. For example, skin glasses for use in AMLCD applications have CTE's (0-300° C.) in the range of $28\text{-}42 \times 10^{-7}/°$ C.

In addition to the glass formers ($SiO_2$, $Al_2O_3$, and $B_2O_3$), the skin glass can include alkaline earth oxides. In one aspect, at least three alkaline earth oxides are part of the glass composition, e.g., MgO, CaO, and BaO, and, optionally, SrO. The alkaline earth oxides provide the glass with various properties important to melting, fining, forming, and ultimate use. In one aspect, the $\Sigma(MgO+CaO+SrO+BaO)/(Al_2O_3)$ is greater than or equal to 1.15, greater than or equal to 1.2, or greater than or equal to 1.25. In another aspect, the $\Sigma(MgO+CaO+SrO+BaO)/(Al_2O_3)$ is less than or equal to 1.55 or less than or equal to 1.50.

The concentrations of MgO, $La_2O_3$, or combinations thereof, in the skin glass and the $\Sigma(MgO+CaO+SrO+BaO+3La_2O_3)/(Al_2O_3)$ ratio of the skin glass, can influence glass performance, particularly meltability and fining. In one aspect, $\Sigma(MgO+CaO+SrO+BaO+3La_2O_3)/(Al_2O_3)$ is greater than or equal to 1.15, greater than or equal to 1.20, or greater than or equal to 1.25. In another aspect, $\Sigma(MgO+CaO+SrO+BaO+3La_2O_3)/(Al_2O_3)$ is greater than or equal to 1.15 and less than or equal to 1.55, or greater than or equal to 1.25 and less than or equal to 1.45.

By increasing the sum of $MgO+La_2O_3$, the liquidus temperature can rise and the liquidus viscosity can fall to a level such that the use of a high viscosity forming process (e.g., a fusion process) is compromised. Therefore, the amount of MgO and $La_2O_3$ can be adjusted accordingly to obtain the desired properties for skin glass formation. In terms of concentrations, when both are present, the combined concentration of $MgO+La_2O_3$ should be between 1.0 and 7.5 mole percent in order to achieve the various benefits described above. In another aspect, the MgO concentration is between 2.0 and 6.0 mole percent or between 3.0 and 6.0 mole percent.

Calcium oxide present in the skin glass composition can produce low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one aspect, the CaO concentration can be greater than or equal to 2.0 mole percent. In another aspect, the CaO concentration of the glass composition is less than or equal to 7.5 mole percent or is between 3.0 and 7.5 mole percent.

The remaining alkaline earth oxides SrO and BaO can both contribute to low liquidus temperatures (high liquidus viscosities) and, thus, the glasses described herein will typically contain at least one of these oxides. However, the selection and concentration of these oxides are selected in order to avoid an increase in CTE and density and a decrease in modulus and strain point. The relative proportions of SrO and BaO can be balanced so as to obtain a suitable combination of physical properties and liquidus viscosity such that the skin glass can be formed by a downdraw process.

In another aspect, the skin can comprise a glass composition as disclosed in U.S. Pat. No. 4,180,618, which is incorporated by reference for its teachings with respect to glass compositions. In one aspect, the skin glass composition comprises a glass exhibiting a linear coefficient of thermal expansion over the temperature range of 0-300° C. between $32\text{-}42 \times 10^{-7}/°$ C., an annealing temperature in excess of 800° C., and a viscosity at the liquidus temperature of at least 100,000 poises, said glass consisting essentially, in percent by weight as calculated from the glass batch on an oxide basis, of 55 to 75% $SiO_2$, 5 to 25% $Al_2O_3$, and at least one alkaline earth metal oxide selected from the group consisting of 9 to 15% CaO, 14 to 20% SrO, 18 to 26% BaO, and a mixture of such oxides wherein the total alkaline earth metal oxide content is equivalent on a molar basis to 9 to 15% CaO.

The glass compositions used to make the skin can include various other oxides to adjust various physical, melting, fining, and forming attributes of the glasses. Examples of such other oxides include, but are not limited to, $TiO_2$, MnO, $Fe_2O_3$, ZnO, $Nb_2O_5$, $MoO_3$, $Ta_2O_5$, $WO_3$, $Y_2O_3$, and $CeO_2$. In one aspect, the amount of each of these oxides can be less than or equal to 2.0 mole percent, and their total combined concentration can be less than or equal to 4.0 mole percent. The skin can also include various contaminants associated with batch materials and/or introduced into the glass by the melting, fining, and/or forming equipment used to produce the glass.

The skin glass compositions are generally alkali free; however, the skin glass can contain some alkali contaminants. In the case of AMLCD applications, it is desirable to keep the alkali levels below 0.1 mole percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In one aspect, the total alkali concentration is less than or equal to 0.07 mole percent.

As discussed above, $\Sigma(MgO+CaO+SrO+BaO+3La_2O_3)/(Al_2O_3)$ and $\Sigma(MgO+CaO+SrO+BaO+3La_2O_3)/(Al_2O_3)$ ratios greater than or equal to 1.15 improve fining, i.e., the removal of gaseous inclusions from the melted batch materials. This improvement allows for the use of more environmentally friendly fining packages. For example, on an oxide basis, the glass compositions described herein can have one or more or all of the following compositional characteristics:

(i) an $As_2O_3$ concentration of at most 0.05 mole percent;
(ii) an $Sb_2O_3$ concentration of at most 0.05 mole percent;
(iii) a $SnO_2$ concentration of at most 0.2 mole percent.

$As_2O_3$ is an effective high temperature fining agent for AMLCD glasses, and in some aspects described herein, $As_2O_3$ is used for fining because of its superior fining properties. However, $As_2O_3$ is poisonous and requires special handling during the glass manufacturing process. Accordingly, in certain aspects, fining is performed without the use of substantial amounts of $As_2O_3$, i.e., the finished glass has at most 0.05 mole percent $As_2O_3$. In one aspect, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the strain point in comparison to glasses that use $As_2O_3$ or $SnO_2$ as a fining agent. Accordingly, in certain aspects, fining is performed without the use of substantial amounts of $Sb_2O_3$, i.e., the finished glass has at most 0.05 mole percent $Sb_2O_3$. In another aspect, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects in the use of these glasses in the manufacture of liquid crystal displays. However, high concentrations of $SnO_2$ are not preferred as this can result in the formation of crystalline defects in AMLCD glasses. In one aspect, the concentration of $SnO_2$ in the finished glass is less than or equal to 0.2 mole percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain aspects, maintaining the $\Sigma(MgO+CaO+SrO+BaO+3La_2O_3)/(Al_2O_3)$ ratio and individual alkaline earth and $La_2O_3$ concentrations within the ranges discussed above makes the fining process easier to perform and more effective.

b. Core

The selection of core glass composition can vary depending upon the skin glass that is used and the end-use of the laminated glass article. In one aspect, the disclosed compositions can have a liquidus viscosity greater than 100,000 poises. For example, a composition can have a liquidus viscosity of greater than 100,000, 200,000, 250,000, 300,000, 350,000, 400,000, 450,000, 500,000, 550,000, 600,000, 650,000, 700,000, 750,000, 800,000, 900,000, 1,000,000, 2,000,000, 3,000,000, or 4,000,000 poises, where any of the stated values can form an upper or lower endpoint when appropriate. The liquidus viscosity can be determined using the techniques discussed above.

Any of the glass compositions disclosed in U.S. Pat. Nos. 5,374,595 and 6,319,867, which are incorporated by reference for their teachings with respect to glass compositions, can be used herein as the core glass composition. In one aspect, the core glass composition comprises a glass exhibiting linear coefficients of thermal expansion over the temperature range of 0-300° C. between $32\text{-}46 \times 10^{-7}$/° C., strain points higher than 650° C., liquidus temperatures no higher than 1200° C., liquidus viscosities greater than 200,000 poises (20,000 Pa), a weight loss of less than 2 mg/cm$^2$ after immersion for 24 hours in an aqueous 5% by weight HCl solution at 95° C., long term stability against devitrification at melting and forming temperatures, and melting viscosities of 200 poises (20 Pa) at less than 1675° C., the glasses being essentially free from alkali metal oxides and composed of, expressed in terms of mole percent on the oxide basis, $SiO_2$ (64-70); $Y_2O_3$ (0-3); $Al_2O_3$ (9.5-14); MgO (0-5); $B_2O_3$ (5-10); CaO (3-13); $TiO_2$ (0-5) SrO (0-5.5); $Ta_2O_5$ (0-5); BaO (2-7); $Nb_2O_5$ (0-5), wherein MgO+CaO+SrO+BaO are 10-20. In another aspect, the core glass composition comprises glasses exhibiting a density less than 2.45 gm/cm$^3$ and a liquidus viscosity greater than 200,000 poises, a strain point exceeding 650° C., and the glass comprises the following composition, expressed in terms of mol percent on an oxide basis: 65-75 $SiO_2$, 7-13 $Al_2O_3$, 5-15 $B_2O_3$, 0-3 MgO, 5-15 CaO, 0-5 SrO, and essentially free of BaO.

Examples of suitable LCD glass useful for the core include, but are not limited to, those disclosed in U.S. Pat. Nos. 5,374,594, 6,060,168, and 6,319,867, and U.S. Published Application Nos. 2002-0082158, 2005-0084440, and 2005-0001201, which are all incorporated by reference herein in their entireties. In a further aspect, the core glass composition is Corning Code 1737 glass or EAGLE$^{2000}$™ glass.

C. Properties and Applications of the Laminated Glass Articles

In one aspect, the disclosed glass articles can have a coefficient of thermal expansion of less than $40 \times 10^{-7}$/° C. over the temperature range of from 0° C. to 300° C. In another aspect, article has a coefficient of thermal expansion of from $28 \times 10^{-7}$/° C. to $40 \times 10^{-7}$/° C. over the temperature range of from 0° C. to 300° C. In some examples, the article can have a coefficient of thermal expansion of 28, 29, 30, 31, 32, 33, 34, 35, 36, 37, 38, 39, or $40 \times 10^{-7}$/° C., where any of the stated values can form an upper or lower endpoint when appropriate. In another aspect, the skin has a coefficient of thermal expansion $\pm 0.1, \pm 0.2, \pm 0.3, \pm 0.4, \pm 0.5, \pm 0.6, \pm 0.7, \pm 0.8, \pm 0.9,$ or $\pm 1 \times 10^{-7}$/° C. to that of the core.

In certain aspects, when the glass article is used in a liquid crystal display (LCD), the thermal stability of the laminated glass article is of interest. Liquid crystal displays are typically comprised of two flat glass sheets that encapsulate a thin layer of liquid crystal material. An array of transparent thin film electrodes on the glass modulate the light transmission properties of the liquid crystal material, thereby creating the image. By incorporating an active device such as a diode or thin film transistor (TFT) at each pixel, high contrast and response speed can be achieved to produce high resolution video displays. Such flat panel displays, commonly referred to as active matrix LCDs (AMLCD), have become the predominant technology for high performance displays such as notebook computers and portable televisions.

At present, most AMLCDs utilize amorphous silicon (a-Si) processes, which have a maximum process temperature of 450° C. Nevertheless, it has long been recognized that the use of polycrystalline silicon (poly-Si) offers certain advantages over a-Si. Poly-Si has a much higher drive current and electron mobility, thereby allowing reduction of TFT size and at the same time increasing the response speed of the pixels. Poly-Si processing also enables the manufacture of display drive circuitry directly onto the glass substrate (on-board logic). Such integration significantly decreases costs and increases reliability and also allows for smaller packages. By contrast, a-Si requires discrete driver chips that must be attached to the display periphery using integrated circuit packaging techniques such as tape carrier bonding.

Poly-Si is conventionally made by depositing amorphous silicon onto a glass sheet using chemical vapor deposition (CVD) techniques, and subsequently crystallizing the a-Si to poly-Si. There are many methods for fabricating poly-Si, which can be grouped in two categories: low-temperature poly-Si methods, which utilize processing temperatures up to 600° C., and high-temperature poly-Si methods, which typically employ temperatures as high as around 900° C.

Many of the low-temperature methods need to employ special techniques to enable processing of a-Si to poly-Si. One such technique is laser recrystallization, in which the substrate is held at a temperature of 400° C. and an excimer laser is used to locally melt and recrystallize the Si layer. Low temperature poly-Si TFTs can also be made by thermally crystallizing amorphous silicon (maximum temperatures of 600° C.). Other process steps, such as ion implantation, can also involve processing at elevated temperatures. At any of these elevated temperature processing steps, compaction can become problematic.

Because the TFT fabrication requires multiple photolithography steps, any irreversible dimensional changes (shrinkage or expansion) in the substrate can result in pattern misalignment between successive exposure steps. Permissible substrate compaction during display processing depends upon the nature of the circuitry design and the size of the display, and for AMLCDs the compaction must amount to no more than a fraction of the smallest feature across the maximum dimension of the display. The thermal compaction or stability can vary and can be just to the point of any given customer's thermal cycle. In one aspect, the skin has a thermal stability or compaction greater (less compaction) than that of the core. In another aspect, the article has a thermal stability or compaction less than 20 ppm, less than 18 ppm, less than 16 ppm, less than 14 ppm, less than 12 ppm, less than 10 ppm, less than 8 ppm, less than 6 ppm, or less than less 4 ppm.

In certain aspects, it is desirable to have a transparent glass article. In one aspect, the disclosed glass articles can have a transparency of greater than 90% transmission between 400 to 800 nm.

The thickness of the skin can vary depending upon the end use of the glass article. In one aspect, the skin has a thickness of 0.1 mm, 0.2 mm, 0.3 mm, 0.4 mm, 0.5 mm, 0.6 mm, 0.7 mm, 0.8 mm, 0.9 mm, 1.0 mm or 1.1 mm, where any value can be an endpoint of any appropriate range. In one aspect, the skin can be alkali free, which is defined herein as a glass having less than 0.1% by weight alkali metals. It is contemplated that the core can be alkali free as well, but it can contain alkali metals depending upon the end-use of the glass article.

In one aspect, the skin comprises a glass composition having a strain point greater than 740° C. and a liquidus viscosity of from 35,000 to 50,000 poises as measured by a gradient boat technique, the core comprises a glass composition having a liquidus viscosity greater than 350,000 poises as measured by a gradient boat technique, and the article comprises a coefficient of thermal expansion of from $28 \times 10^{-7}/°$ C. to $40 \times 10^{-7}/°$ C. over the temperature range of from 0° C. to 300° C., wherein the skin has a coefficient of thermal expansion $\pm 1 \times 10^{-7}/°$ C. to that of the core.

In general, the glass articles described herein can be used for electronic applications. For example, the articles described herein can be used to fabricate flat screen display panels. In one aspect, the articles can be used as an organic light emitting diode or a substrate for a thin film transistor. In another aspect, the glass articles described herein can be used in liquid crystal displays. Liquid crystal displays (LCDs) are passive flat panel displays that depend upon external sources of light for illumination. The production of liquid crystal displays was described above.

II. Methods for Making Glass Articles

In one aspect, disclosed herein are methods for preparing laminated glass articles. In one aspect, the method comprises applying by fusion drawing to at least one exposed surface of a glass core a glass skin, wherein the skin comprises a strain point greater than 650° C. In some examples, the skin can be applied to the exposed surface of the core by a fusion process. An example of a suitable fusion process is disclosed in U.S. Pat. No. 4,214,886, which is incorporated by reference herein in its entirety. This process can be summarized as follows. At least two glasses of different compositions (e.g., the base or core glass sheet and the skin) are separately melted. Each of the glasses is then delivered through an appropriate delivery system to an overflow distributor. The distributors are mounted one above the other so that the glass from each flows over top edge portions of the distributor and down at least one side to form a uniform flow layer of appropriate thickness on one or both sides of the distributor below such top edge portions.

The bottom distributor has a wedge-shaped forming member associated therewith having converging sidewall portions which communicate at their top end with the sidewalls of said distributor and terminate at their converging bottom ends in a draw line. The molten glass overflowing the bottom distributor flows downwardly along the distributor walls and forms an initial glass flow layer adjacent to the converging outer surfaces of the forming member, whereas the molten glass overflowing the distributor thereabove flows downwardly over the upper distributor walls and flows over outer surface portions of the initial layer. The two individual layers of glass from each converging sidewall of the forming member are brought together and fused at the draw line to form a single continuously laminated sheet. The central glass in a two-glass laminate is called the core glass, whereas the glasses flowing down the external surface of the core glass are called skin glasses. When three or more separate glasses are utilized, those glasses that are formed intermediate the core and skin glasses are known as either central or embedded glasses. When central or embedded glasses are used, the skin is "connected" to the core by the central or embedded glass. Conversely, when just one skin glass is fused directly to the core, the skin is "adjacent" to the core.

The overflow distributor process provides a fire polished surface to the sheet glass so formed, and the uniformly distributed thickness of the glass provided by the controlled distributor, provides a glass sheet with superior optical quality.

Other fusion processes, which can be used in the methods disclosed herein, are described in U.S. Pat. Nos. 3,338,696, 3,682,609, 4,102,664, 4,880,453, and U.S. Published Application No. 2005-0001201, which are incorporated by reference herein in their entireties.

In one aspect, the glass article can be a sheet of glass (core) having a first and second exposed surface, wherein the skin is adjacent to both the first and second exposed surface. Putting the skin on both the first and second exposed surfaces of the glass sheet core can have several advantages. For example, the glass sheet can be effectively thicker during the display manufacture, lessening concerns regarding handling sag and damage. This can allow the use of thinner, lightweight glass for display manufacture. Further, depending upon the composition of the skin, it allows for the skin to be removed from one surface (e.g., the surface that is to receive the TFTs in display manufacture), while leaving the other surface protected.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention that are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

FIG. 1 shows a cross-sectional view of a double fusion process. Referring to FIG. 1, 1 represents a traditional fusion pipe in which core glass 2 fills a top trough region 3 and overflows the weirs of the fusion pipe 9, flows down both sides, and rejoins into a sheet at the root of the fusion pipe 4. In a double fusion process, an upper fusion pipe 5 is positioned above the traditional fusion pipe 1. This upper fusion pipe also has a trough region 6, which is filled with glass 7 that will become the skin of the laminated sheet. This glass flows over the weirs of the upper fusion pipe, down its sides, and onto the surface of the core glass. The root of the skin glass fusion pipe 8 operates at a temperature and viscosity similar to the core glass at its weir position. If a core glass is composed of EAGLE[2000]™ glass, the root of the skin fusion pipe is at ~1240° C. and 40,000 poises.

As an example of a low compaction laminated sheet, a laminated sheet in which the core glass is the EAGLE[2000]™ glass composition can be used. This glass has a (0-300° C.) CTE of $31.8 \times 10^{-7}/°$ C., a liquidus viscosity (as measured by the gradient boat technique) suitable for the fusion process at 900,000 p, and a strain point of 666° C. Under a thermal cycle of 450° C. for 6 hrs, EAGLE[2000]™ glass (in 0.7 mm thickness and drawn at 600 lbs/hr) exhibits approximately 35 ppm compaction. Weir temperatures for EAGLE[2000]™ glass are in the range of 1240° C.

One example of a low compaction skin glass for the EAGLE²⁰⁰⁰™ glass composition is given below, with amounts expressed in wt %.

| | |
|---|---|
| SiO$_2$ | 62.2 |
| Al$_2$O$_3$ | 18.1 |
| B$_2$O$_3$ | 10.2 |
| MgO | 0.12 |
| CaO | 7.63 |
| SrO | 0.76 |
| As$_2$O$_3$ | 1.02 |

This glass is predicted to have a liquidus temperature of 1240° C. or 35,000 p, a CTE of 31.1×10⁻⁷/° C. and a strain point of 681° C. While it is unknown exactly how much the compaction would decrease with this type of strain point increase; compaction modeling results indicate a 25% reduction in compaction is a reasonable expectation if the compaction response was controlled by the skin glass. In actual practice, the compaction of the laminated sheet may be somewhat less, with the actual value dependant upon the thicknesses of the respective layers and other factors.

What is claimed is:

1. A laminated glass sheet comprising a central core that comprises a core glass and an external skin that comprises a skin glass wherein:
   (a) the skin glass has a strain point greater than or equal to 700° C. and a melting temperature that is less than or equal to 1,665° C.;
   (b) when measured by a gradient boat technique, the skin glass has a liquidus viscosity that is in the range of 15,000-80,000 poise and the core glass has a liquidus viscosity that is greater than 100,000 poise so that the core glass is more stable with respect to devitrification during formation by a fusion overflow downdraw process than the skin glass; and
   (c) the laminated glass sheet is formed by a double fusion overflow downdraw process so that the central core has a rejoin surface and the external skin has a fire-polished surface.

2. The laminated glass sheet article of claim 1, wherein the external skin is adjacent to the central core.

3. The laminated glass sheet article of claim 1, wherein the skin glass has a liquidus viscosity of from 20,000 to 50,000 poises as measured by a gradient boat technique, wherein the glass article is made by fusion drawing.

4. The laminated glass sheet article of claim 1, wherein the laminated glass sheet has an average coefficient of thermal expansion less than 40×10⁻⁷/° C. over the temperature range of from 0° C. to 300° C.

5. The laminated glass sheet article of claim 1, wherein the skin glass is alkali free.

6. The laminated glass sheet article of claim 1, wherein the skin glass is alkali free and comprises in mole percent on an oxide basis:

| | |
|---|---|
| SiO$_2$ | 64.0-72.0 |
| B$_2$O$_3$ | 1.0-5.0 |
| Al$_2$O$_3$ | 9.0-16.0 |
| MgO + La$_2$O$_3$ | 1.0-7.5 |
| CaO | 2.0-7.5 |
| SrO | 0.0-4.5 |
| BaO | 1.0-7.0 | wherein:
   $1.15 \leq \Sigma(MgO+CaO+SrO+BaO+3La_2O_3)/(Al_2O_3) \leq 1.55$, where Al$_2$O$_3$, MgO, CaO, SrO, BaO, and La$_2$O$_3$ represent the mole percents of the representative oxide components.

7. The laminated glass sheet article of claim 1, wherein the skin glass is alkali free and comprises in mole percent on an oxide basis:

| | |
|---|---|
| SiO$_2$ | 65.0-71.0 |
| Al$_2$O$_3$ | 9.0-16.0 |
| B$_2$O$_3$ | 1.5-4.0 |
| MgO + La$_2$O$_3$ | 0.5-7.5 |
| CaO | 2.0-6.0 |
| SrO | 0.0-4.5 |
| BaO | 1.0-7.0 |
| La$_2$O$_3$ | 0.0-4.0 | wherein $\Sigma(MgO+CaO+SrO+BaO+3La_2O_3)/(Al_2O_3) \geq 1.2$, where Al$_2$O$_3$, MgO, CaO, SrO, BaO, and La$_2$O$_3$ represent the mole percents of the representative oxide components.

8. The laminated glass sheet article of claim 1, wherein the skin glass is alkali free and comprises an alkali free glass comprising in mole percent on an oxide basis:

| | |
|---|---|
| SiO$_2$ | 65.0-72.0 |
| Al$_2$O$_3$ | 10.0-15.0 |
| B$_2$O$_3$ | 1.0-4.0 |
| MgO | 2.0-7.5 |
| CaO | 3.0-6.0 |
| SrO | 0.0-4.5 |
| BaO | 1.0-6.0 | wherein $\Sigma(MgO+CaO+SrO+BaO)/(Al_2O_3) \geq 1.15$, where Al$_2$O$_3$, MgO, CaO, SrO, and BaO represent the mole percents of the representative oxide components.

9. The laminated glass sheet article of claim 1, wherein the sheet has a thermal compaction less than 20 ppm.

10. An electronic device comprising the laminated glass sheet of claim 1.

11. A liquid crystal display comprising the laminated glass sheet of claim 1.

12. The laminated glass sheet of claim 1, further comprising a thin film transistor on at least one fire-polished surface of the external skin.

13. The laminated glass sheet of claim 12, wherein the thin film transistor comprises poly-crystalline silicon.

14. A method for producing a laminated glass sheet of claim 1, comprising applying the external skin to at least one exposed surface of the central core.

15. The laminated glass sheet of claim 1 wherein the strain point of the skin glass is greater than 740° C.

16. The laminated glass sheet of claim 1 wherein the liquidous viscosity of the core glass is greater than 350,000 poise.

17. The laminated glass sheet of claim 1 wherein the strain point of the skin glass is greater than 740° C. and the liquidous viscosity of the core glass is greater than 350,000 poise.

18. The laminated glass sheet of claim 1 wherein, when measured by compaction, the skin glass is more thermally stable than the core glass.

* * * * *